(12) United States Patent
Wang et al.

(10) Patent No.: US 9,491,767 B2
(45) Date of Patent: Nov. 8, 2016

(54) METHOD AND SYSTEM FOR FREQUENCY REUSE IN WIRELESS RELAY SCENARIO

(75) Inventors: Yanlong Wang, Shenzhen (CN); Yongyu Chang, Shenzhen (CN); Jie Gao, Shenzhen (CN); Yun Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 212 days.

(21) Appl. No.: 14/234,730

(22) PCT Filed: Dec. 12, 2011

(86) PCT No.: PCT/CN2011/083838
§ 371 (c)(1),
(2), (4) Date: Jan. 24, 2014

(87) PCT Pub. No.: WO2012/151987
PCT Pub. Date: Nov. 15, 2012

(65) Prior Publication Data
US 2014/0192706 A1    Jul. 10, 2014

(30) Foreign Application Priority Data

Jul. 25, 2011 (CN) .......................... 2011 1 0208999

(51) Int. Cl.
*H04W 72/04* (2009.01)
*H04W 16/04* (2009.01)
(Continued)

(52) U.S. Cl.
CPC ......... *H04W 72/0486* (2013.01); *H04W 16/04* (2013.01); *H04W 74/0866* (2013.01); *H04W 84/047* (2013.01)

(58) Field of Classification Search
CPC ............ H04B 7/2606; H04B 7/15592; H04B 7/15542; H04W 84/047; H04W 72/082; H04W 16/10; H04W 72/04; H04W 72/0426; H04W 72/044; H04L 27/2627
See application file for complete search history.

(56) References Cited

U.S. PATENT DOCUMENTS

| | | | |
|---|---|---|---|
| 8,958,836 B2* | 2/2015 | Chen ................... | H04W 52/346 455/450 |
| 2004/0131125 A1* | 7/2004 | Sanderford, Jr. ......... | H04L 5/06 375/261 |

(Continued)

FOREIGN PATENT DOCUMENTS

| | | |
|---|---|---|
| CN | 101212762 A | 7/2008 |
| CN | 101291515 | 10/2008 |

(Continued)

OTHER PUBLICATIONS

International Search Report for corresponding application PCT/CN2011/083838 filed Dec. 12, 2011; mail date Apr. 5, 2012.

*Primary Examiner* — Jung-Jen Liu
(74) *Attorney, Agent, or Firm* — Cantor Colburn LLP

(57) ABSTRACT

The disclosure provides a method for frequency reuse in a wireless relay scenario, wherein a center frequency spectrum, an edge frequency spectrum and a random access frequency spectrum are pre-allocated to a cell according to a scenario parameter in the cell; load conditions of all mobile stations (MSs) covered by each relay station (RS) in the cell is calculated and reported to a base station (BS); the BS allocates the random access frequency spectrum to an RS according to load conditions of all RSs and schedules MSs. The disclosure also provides a system for frequency reuse in a wireless relay scenario. With the method and system above, the frequency spectrum planning is configurable, the random access frequency spectrum is introduced, and both the load balancing and user fairness are taken into consideration, which improves the throughput at the edge of the cell, especially can increase the throughput for the users whose throughput ranks poorly.

14 Claims, 3 Drawing Sheets

(51) Int. Cl.
*H04W 84/04* (2009.01)
*H04W 74/08* (2009.01)

(56) References Cited

U.S. PATENT DOCUMENTS

| | | | | | |
|---|---|---|---|---|---|
| 2008/0045139 | A1* | 2/2008 | Chen | ............... | H04W 16/14 455/3.04 |
| 2008/0165881 | A1* | 7/2008 | Tao | ............... | H04B 7/2606 375/267 |
| 2009/0203384 | A1* | 8/2009 | Vujcic | ............... | H04W 74/08 455/450 |
| 2009/0233544 | A1* | 9/2009 | Oyman | ............... | H04B 7/15592 455/7 |
| 2010/0035620 | A1* | 2/2010 | Naden | ............... | H04B 7/15542 455/450 |
| 2010/0173644 | A1* | 7/2010 | Koyanagi | ............... | H04B 7/155 455/453 |
| 2010/0195607 | A1* | 8/2010 | Lee | ............... | H04W 74/0866 370/329 |
| 2011/0149879 | A1* | 6/2011 | Noriega | ............... | H04W 72/1236 370/329 |
| 2011/0199985 | A1* | 8/2011 | Cai | ............... | H04L 1/0026 370/329 |
| 2013/0242854 | A1* | 9/2013 | Cai | ............... | H04L 1/0026 370/315 |
| 2014/0036881 | A1* | 2/2014 | Kim | ............... | H04L 5/001 370/336 |
| 2014/0036889 | A1* | 2/2014 | Kim | ............... | H04L 1/1854 370/336 |
| 2014/0071864 | A1* | 3/2014 | Seo | ............... | H04L 1/1861 370/294 |
| 2014/0112280 | A1* | 4/2014 | Lee | ............... | H04W 72/04 370/329 |

FOREIGN PATENT DOCUMENTS

| | | |
|---|---|---|
| CN | 101379772 | 3/2009 |
| CN | 101610518 | 12/2009 |
| CN | 101965695 | 12/2010 |
| CN | 101965695 | 2/2011 |

* cited by examiner

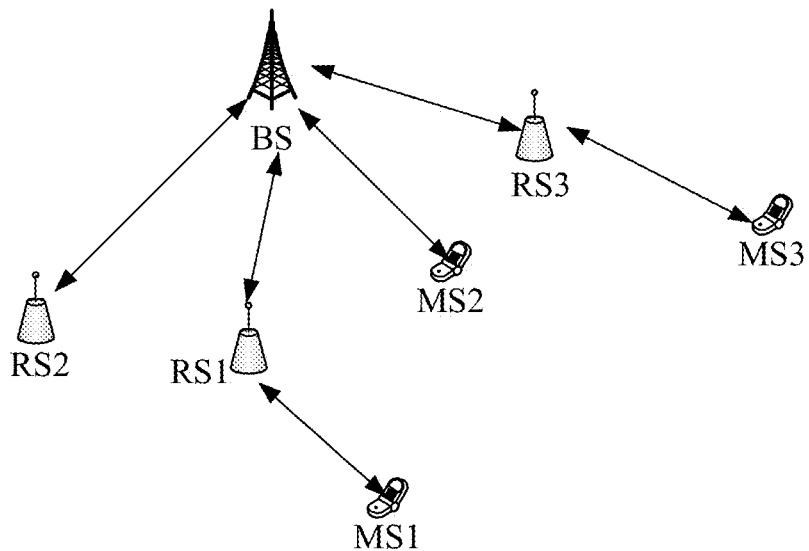
Fig. 1
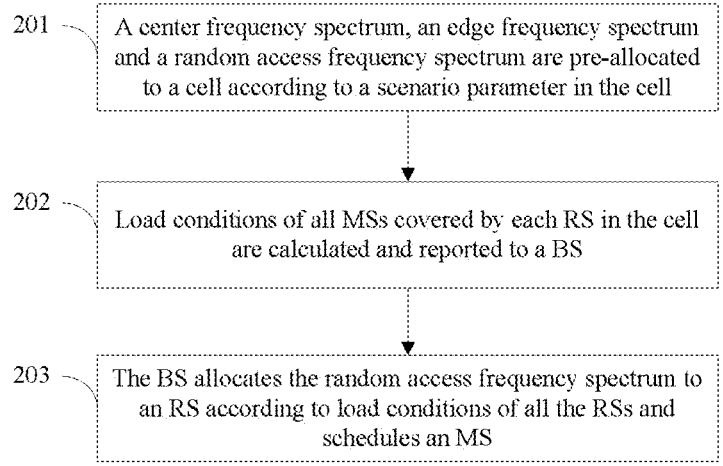
Fig. 2
| Center frequency spectrum $B_{BS}$ | Edge frequency spectrum $B_{RS}$ | Random access frequency spectrum $B_{RA}$ |
Fig. 3

METHOD AND SYSTEM FOR FREQUENCY REUSE IN WIRELESS RELAY SCENARIO

TECHNICAL FIELD

The disclosure relates to a frequency reuse technology in a wireless communication field, and more especially to a method and a system for frequency reuse in a wireless relay scenario.

BACKGROUND

As one of the most important multiple access methods in a wireless network system with a high data rate in the future, Orthogonal Frequency Division Multiple Access (OFDMA), also called Orthogonal Frequency Division Multiple (OFDM) for short, has been written into a Worldwide Interoperability for Microwave Access (WiMAX) protocol and a Long Term Evolution (LTE) protocol as specifications, and has been determined as an access technology in two candidate standards of the International Mobile Telecommunications-Advanced (IMT-Advanced): the LTE-Advanced promoted by the third generation partnership project (3GPP) and the 802.16m promoted by the Institute of Electrical and Electronics Engineers (IEEE).

Generally, the OFDM technology divides a channel into several orthogonal sub-channels, and converts a high speed data signal into parallel low speed sub-data-streams which are modulated to respective sub-channels for transmission. In this way, multiple users in the same cell can perform transmission simultaneously on different sub-carriers, thereby decreasing the interference in the cell significantly. However, when users of the edge of adjacent cells are allocated with the same frequency band, inter-cell interference (ICI) has great effect on the performance of the system. To solve the problem, considering the attenuation characteristic of electromagnetic waves during propagation in the space, after one frequency is used in a certain area, the power has attenuated greatly at a place far away from the area above, and the interference has decreased to an acceptable degree, the frequency can be used again, thus the concept of frequency reuse is put forward. To achieve the purpose of avoiding ICI to the greatest extent, the frequency reuse solution usually is implemented by configuring a proper frequency reuse factor (FRF). If the FRF is too small, it seems that very high frequency spectrum efficiency can be reached, but it also means the probability that the users at the boundary of the adjacent cells use the same frequency is increased, and the ICI caused between the users at the edge of the cells is intensified, thus affecting the quality of service at the edge of the cells. On the other hand, if the FRF is too high, the frequency spectrum efficiency of the system is decreased, in this way it is hard to meet high quality and high speed service demands for the fourth generation communication (4G) system. Therefore, it is very essential to select a proper reuse factor according to the deployment scenario of a cell.

A traditional frequency reuse solution includes frequency reuse with an FRF of 3, fractional frequency reuse and soft frequency reuse, etc. The frequency reuse solution with the FRF of 3 is to divide frequency resources into three equal sub-bandwidths, and adjacent cells use three different sub-bandwidths respectively to avoid the interference between the cells caused by the same frequency. The fractional frequency reuse solution is that the same frequency is used inside all the cells, high FRF is adopted at the cell edge and different frequencies are used at the edge areas of adjacent cells with an aim of reducing the ICI effectively and increasing the frequency spectrum efficiency. The soft frequency reuse solution is that a power factor is taken into consideration based on the fractional frequency reuse and the frequency spectrum is no longer divided into several parts mechanically but with the use degree of the frequency spectrum specified by the power, which enables the FRF make a smooth transition from 1 to N so as to obtain a greater bandwidth and frequency spectrum efficiency. Meanwhile, if sectorization, time, power, load and other factors are taken into consideration, more variations of the frequency reuse solution can be obtained.

The IMT-Advanced, started by the International Telecommunications Union (ITU) with the aim of meeting the global mobile communication requirements in the future 10 to 15 years, features higher data rate, greater system capacity, more flexible and extensive service and application, and more powerful ability to support new services. To meet these requirements, almost all the candidate standards of the IMT-Advanced introduce Relay transmission as a key technology into the development process of the standards. At present, there are three relay standards that have been or are being specified in IEEE 802.16j, IEEE 802.16m and 3GPP LTE-A Release 10. Relaying refers to that, by adding intermediate nodes between a base station (BS) and a mobile station (MS), signals sent by the BS or the MS are re-generated, amplified and then forwarded to the MS or the BS, so as to improve the quality and reliability of the signal transmission. The main role of the relay technology is to extend the coverage area of the cell, provide service signals for the area with severe shadow fading in the cell and dead spots of coverage, provide the coverage for the hot region and indoor coverage, etc. The 3GPP divides a relay station (RS) into Type1 Relay and Type2 Relay according to whether the RS has an independent cell identity (ID). Type1 Relay, having an independent cell ID, can transmit a reference signal and a synchronization signal of the Type1 Relay, and has independent Hybrid Automatic Repeat Request (HARQ) feedback, etc. At this time, the RS is equivalent to a Release 8 BS, and the MS can tell apart an RS and a BS. However, Type2 Relay does not have an independent cell ID, and the MS can not identify the RS. The RS can transmit a service channel, but can not transmit a common pilot signal (CRS) and a Physical Downlink Control Channel (PDCCH), etc. because the RS has no independent cell ID. In addition, according to whether a relay link and an access link share the same frequency resources or not, the RS can also be divided into an in-band relay and an out-band relay.

However, regardless of the types of the RS and the relay deployment scenario, the frequency planning and frequency reuse of the BS and the RS shall be considered to solve the ICI problem, so as to extend the coverage area of the cell, improve the system capacity, peak rate and other performance. Compared with a cellular network without relay deployment, in a cellular network with relay deployment, in addition that a BS performs direct communication with a mobile station $MS_c$ within the coverage of the BS, it is also required that the BS performs indirect communication with a mobile station $MS_r$ at the cell edge through multi-hop relay, namely the first hop link BS→RS and the second hop link RS→$MS_r$. Therefore, the frequency reuse solution of a relay system shall be more flexible compared to that of a traditional OFDM cellular cell. Similar to the frequency reuse solution of a traditional cellular network, the frequency reuse solution of the cell in the relay scenario can be derived, such as the soft frequency reuse and the fractional frequency reuse of two-hop relay. However, the main purpose of most of the traditional frequency reuse solutions is to eliminate the interference between cells to the greatest extent, or further to take the frequency spectrum efficiency into consideration, but the problems of user fairness and load balancing are ignored to some degree.

SUMMARY

In view of the above, the disclosure provides a method and a system for frequency reuse in a wireless relay scenario, so as to solve the problem that user fairness and load balancing can not be taken into consideration simultaneously in the wireless relay scenario.

To solve the technical problem above, the technical solution of the disclosure is realized as follows.

The disclosure provides a method for frequency reuse in a wireless relay scenario, including: pre-allocating a center frequency spectrum, an edge frequency spectrum and a random access frequency spectrum to a cell according to a scenario parameter in the cell; calculating load conditions of all mobile stations (MSs) covered by each relay station (RS) in the cell and reporting the load conditions to a base station (BS); the BS allocating the random access frequency spectrum to an RS according to load conditions of all RSs and scheduling an MS.

Preferably, before calculating the load conditions of all the MSs covered by each RS in the cell, the method further includes: distinguishing an MS accessing through an RS from all MSs in the cell.

Preferably, after pre-allocating the center frequency spectrum, the edge frequency spectrum and the random access frequency spectrum, the method further includes: judging whether a preset time arrives, if the preset time arrives, calculating the load conditions of all the MSs covered by each RS in the cell, or distinguishing an MS accessing through an RS from all MSs in the cell; otherwise, maintaining wideband resources of the RSs.

Preferably, the scenario parameter in the cell includes: the number of the RSs in the cell, positions of the RSs in the cell, a frame type of the cell, and statistic characteristics of users of the cell.

Preferably, the BS allocating the random access frequency spectrum to each RS according to the load conditions of all the RSs includes: the BS sorting all the RSs according to the load conditions; calculating a relative load factor of each RS according to a load factor of an RS with a lightest load; according to the relative load factor, calculating a probability that the random access frequency spectrum is allocated to each RS, and allocating the random access frequency spectrum to an RS with a highest probability.

Preferably, scheduling the MS is embodied as: scheduling the MS by means of a proportional fairness scheduling algorithm.

The disclosure also provides a system for frequency reuse in a wireless relay scenario, including a base station (BS) and one or more relay stations (RSs), wherein the BS is configured to pre-allocate a center frequency spectrum, an edge frequency spectrum and a random access frequency spectrum to a cell according to a scenario parameter in the cell, allocate the random access frequency spectrum to an RS according to load conditions of all RSs and schedule a mobile station (MS);

the RS is configured to calculate load conditions of all MSs covered by each RS in the cell and report the load conditions to the BS.

Preferably, the BS is further configured to distinguish an MS accessing through an RS from all MSs in the cell.

Preferably, the BS is further configured to judge whether a preset time arrives, if the preset time arrives, calculate the load conditions of all the MSs covered by each RS in the cell, or distinguish an MS accessing through an RS from all MSs in the cell; otherwise, maintain wideband resources of the RSs.

Preferably, the scenario parameter in the cell includes: the number of the RSs in the cell, positions of the RSs in the cell, a frame type of the cell, and statistic characteristics of users of the cell.

Preferably, the BS allocating the random access frequency spectrum to each RS according to the load conditions of all the RSs includes: the BS sorting all the RSs according to the load conditions; calculating a relative load factor of each RS according to a load factor of an RS with a lightest load; according to the relative load factor, calculating a probability that the random access frequency spectrum is allocated to each RS, and allocating the random access frequency spectrum to an RS with a highest probability.

The method and system for frequency reuse in the wireless relay scenario provided by the disclosure include: a center frequency spectrum, an edge frequency spectrum and a random access frequency spectrum are pre-allocated for a cell according to a scenario parameter in the cell; load conditions of all MSs covered by each RS in the cell are calculated and reported to a BS; the BS allocates the random access frequency spectrum to the RS according to load conditions of all the RSs and schedules the MS. With the method and system above, the frequency spectrum allocation is enabled to be configured, namely the center frequency spectrum, the edge frequency spectrum and the random access frequency spectrum can be pre-configured according to the number of the RSs in the cell, the positions of the RSs in the cell and the time slot structure of the cell, the statistic characteristics of users of the cell and other parameters. Meanwhile, the disclosure also takes the factor of load balancing into consideration, which ensures the user fairness to a great extent and improves the throughput at the edge of the cell, especially increases the throughput for the users whose throughput ranks poorly, wherein the users whose throughput ranks poorly are 5% of the users at the bottom of a ranking list of the throughput.

BRIEF DESCRIPTION OF THE DRAWINGS

FIG. 1 is a schematic diagram of the structure of a general transmission mode of a relay system;

FIG. 2 is a schematic diagram of the flow of a method for frequency reuse in a wireless relay scenario according to an embodiment of the disclosure;

FIG. 3 is a schematic diagram of frequency spectrum planning according to an embodiment of the disclosure;

DETAILED DESCRIPTION OF THE EMBODIMENTS

Figure 4:
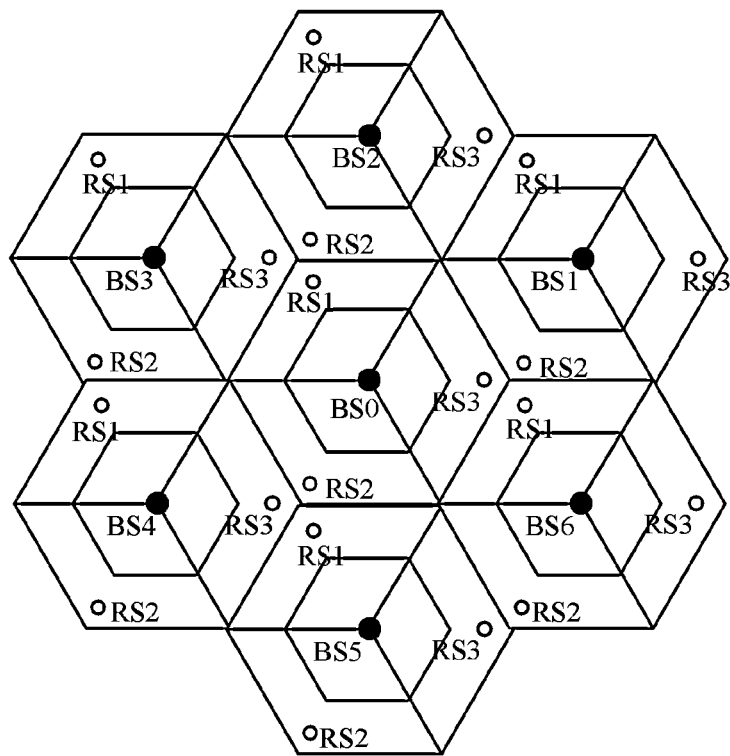
FIG. 4 is a schematic diagram of the scenario of an embodiment of frequency reuse in the wireless relay scenario according to the embodiment of the disclosure.

The basic principle of the embodiments of the disclosure is: a center frequency spectrum, an edge frequency spectrum and a random access frequency spectrum are pre-allocated for a cell according to a scenario parameter in the cell; load conditions of all MSs covered by each RS in the cell are calculated and reported to a BS; the BS allocates the random access frequency spectrum to the RS according to load conditions of all the RSs and schedules an MS.

For better understanding the disclosure, the structure of a relay system is introduced at first. FIG. 1 is a schematic diagram of the structure of a general transmission mode of the relay system. As shown in FIG. 1, the relay system is a multi-hop wireless network, including a BS, an RS1, an RS2, an RS3, an MS1, an MS2 and an MS3, wherein the link between the BS and the MS2 is a direct link; the BS is coupled with the MS3 through the RS3, the link between the BS and the RS3 is a reverse link, and the link between the RS3 and the MS3 is an access link.

It shall be specially noted that: the MS at the cell edge in the background is $MS_r$, which specifically refers to an MS accessing the BS randomly through the RS. In the follow-up description of the disclosure, $MS_e$ is used to represent the MS at the cell edge. In practical application, the RS is usually deployed at the cell edge, so the $MS_r$ accessing the BS randomly through the RS is equivalent to the $MS_e$ at the cell edge. In addition, all the MSs in the disclosure access the BS through the RS, and whether the MSs are at the cell edge is not limited.

The technical solution of the disclosure will be further illustrated hereinafter in conjunction with the accompany drawings and the embodiments.

FIG. 2 is a schematic diagram of the flow of the method for frequency reuse in the wireless relay scenario according to an embodiment of the disclosure. As shown in FIG. 2, the method includes the following steps.

Step 201, a center frequency spectrum, an edge frequency spectrum and a random access frequency spectrum are pre-allocated for a cell according to a scenario parameter in the cell.

Specifically, the scenario parameter in the cell includes: the number of RSs in the cell, the positions of the RSs in the cell, the frame type of the cell, statistic characteristics of users of the cell and other parameters. Specifically, the pre-allocated center frequency spectrum $B_{BS}$ is: the frequency spectrum that is used for data transmission of the direct link from the BS to the MS within the coverage of the cell (namely the link of BS→$MS_c$). Specifically, the edge frequency spectrum is: the frequency spectrum that is used for the data transmission of the reverse link from the BS to the RS (namely the link of BS→RS) and the access link from the RS to the MS at the cell edge (namely the link of RS→$MS_e$). The rest of the frequency spectrums are the random access frequency spectrum $B_{RA}$. Specifically, if a cell is divided into three sectors, $B_{BS}$ can be further divided into $B_{BS1}$, $B_{BS2}$ and $B_{BS3}$; if multiple RSs are deployed in one cell, $B_{RS}$ can be further divided into $B_{RS1} \ldots B_{RSn}$. After the pre-allocation of the frequency spectrum, a schematic diagram of the frequency spectrum planning is as shown in FIG. 3.

Step 202, load conditions of all MSs covered by each RS in the cell are calculated and reported to the BS.

Specifically, all the MSs mentioned above refer to all the MSs in the edge area covered by each RS. Calculating the load conditions of all the MSs includes: a load condition of each RS is calculated; if a full buffer service model is adopted, the load of each RS can be equivalent to an average throughput of all the MSs accessing the RS, namely the calculation can be simplified to the calculation of the average throughput of the MSs.

Preferably, before Step 202, the method further includes: an MS accessing through the RS is distinguished from all the MSs in the cell.

Specifically, according to the positions of the MSs, the Signal to Interference plus Noise Ratio (SINR) and other information, all the MSs in the cell are divided into an aggregate $M_{BS}$ accessed by the BS or an aggregate $M_{RS}$ accessed by the RS. The aggregate $M_{RS}$ includes all the MSs accessed by the RS.

Step 203, the BS allocates the random access frequency spectrum to the RS according to the load conditions of all the RSs and schedules an MS.

Specifically, the BS allocating the random access frequency spectrum to the RS according to the load conditions of all the RSs includes: the BS sorts all the RSs according to the load conditions, calculates a relative load factor of each RS according to a load factor of an RS with the lightest load, calculates a probability that the random access frequency spectrum is allocated to each RS and allocates the random access frequency spectrum to the RS with a highest probability. Specifically, scheduling the MS is embodied as: the MS is scheduled by means of a proportional fairness scheduling algorithm.

Preferably, after Step 201, the method further includes: it is judged whether a preset time arrives, if so, Step 202 is implemented; otherwise, wideband resources of the RS are maintained.

It shall be specially noted that, if the judgment result shows the preset time arrives, the following method is also feasible: the MS accessing through the RS is distinguished from all the MSs in the cell firstly, and then Step 202 is implemented.

Figure 5:
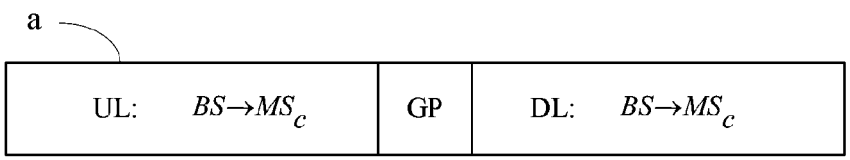
FIG. 5 is the structure of a time slot of the system in the scenario described in the embodiment.
Figure 5:
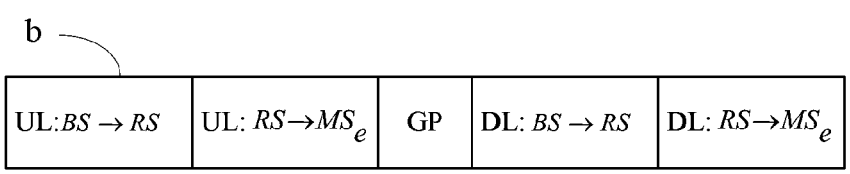
Figure 6:
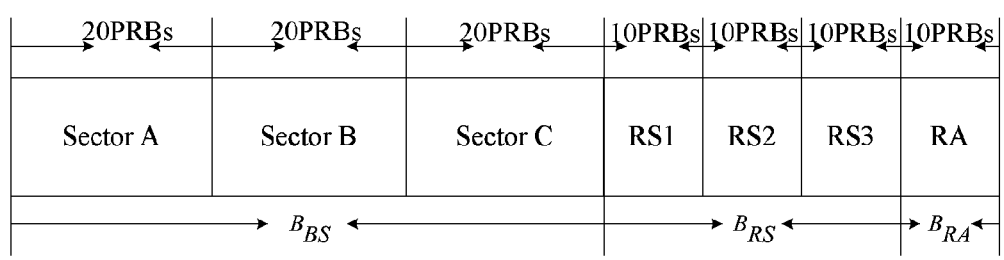
FIG. 6 is a schematic diagram of the frequency spectrum planning configured in the scenario described in the embodiment.

FIG. 4 is a schematic diagram of the scenario of the embodiment of frequency reuse in the wireless relay scenario according to the disclosure. As shown in FIG. 4, the embodiment is a two-hop relay cellular network, wherein each cell is divided into three sectors, and each sector is configured with a 120° directional transmitting antenna and has one RS deployed at the vertex, namely the edge area of each sector has one RS and there are three RSs in one cell to cover the edge cell. It is clear that the structure of the time slot of the system in the scenario described is as shown in FIG. 5. The direct link BS→$MS_c$ (as shown in a of FIG. 5) performs data transmission in each time slot, while the reverse link BS→RS and the access link RS→$MS_e$ (as shown in b of FIG. 5) perform data transmission through two time slots respectively. This transmission mode is adopted in both the uplink and the downlink. It is assumed that the total bandwidth allocated to the system is 20M, which can be equivalently converted into 100 physical resource blocks (PRBs). According to the statistic characteristics of the users, supposing that the center area is pre-configured with 60PRBs and the edge area is pre-configured with 30PRBs, the pre-configuration of ($B_{BS}$, $B_{RS}$, $B_{RA}$) that can be obtained is equivalent to (60, 30, 10). Since there are three sectors and three RSs are deployed in each sector, the resource blocks in the center area and the edge area are further divided. The schematic diagram of the specific frequency spectrum planning is as shown in FIG. 6.

Figure 7:
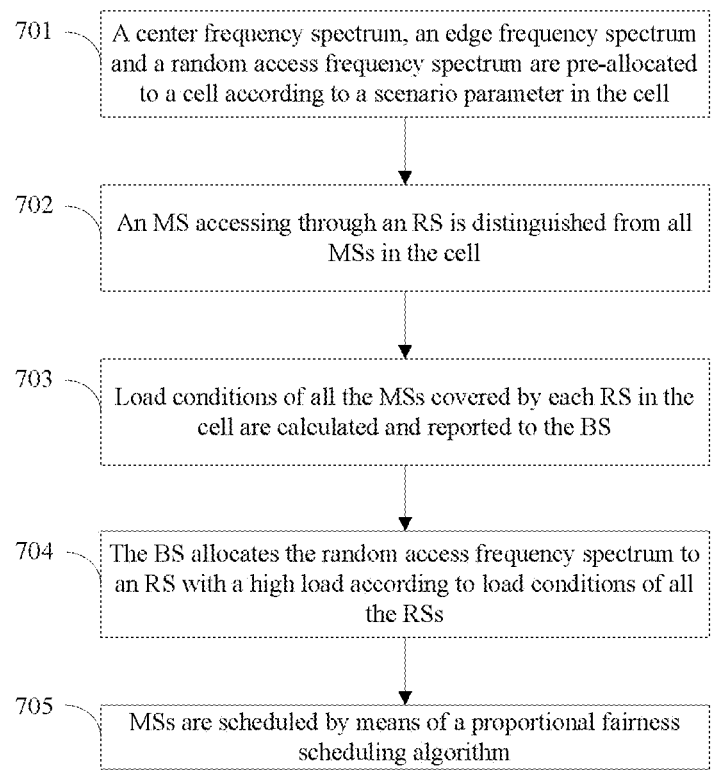
FIG. 7 is a schematic diagram of the flow of the method of the frequency reuse embodiment in the wireless relay scenario according to the embodiment of the disclosure.

FIG. 7 is a schematic diagram for the flow of the method of a frequency reuse embodiment in the wireless relay scenario according to the disclosure. As shown in FIG. 7, in the scenario of FIG. 4, the method includes the following steps.

Step 701, a center frequency spectrum, an edge frequency spectrum and a random access frequency spectrum are pre-allocated to a cell according to a scenario parameter in the cell.

Specifically, the scenario parameter in the cell includes: the number of the RSs in the cell, the positions of the RSs in the cell, the frame type of the cell, and statistic characteristics of users of the cell, etc. The center frequency spectrum $B_{BS}$, the edge frequency spectrum $B_{RS}$ and the random access frequency spectrum $B_{RA}$ pre-allocated are equivalent to 60, 30 and 10 respectively.

Step 702, an MS accessing through the RS is distinguished from all the MSs in the cell.

Specifically, according to the positions of the MSs, the SINR and other information, all the MSs are divided into an aggregate $M_{BS}$ accessed by the BS or an aggregate $M_{RS}$ accessed by the RS. The aggregate $M_{RS}$ includes all the MSs accessed by the RS.

Preferably, before Step 702, the method further includes: it is judged whether a preset time arrives, if so, Step 702 is implemented; otherwise, wideband resources of the RS are maintained.

Step 703, load conditions of all MSs covered by each RS in the cell are calculated and reported to the BS.

Specifically, calculating the load conditions of all the MSs includes: a load condition of each RS is calculated; if a full buffer service model is adopted, the load of each RS can be equivalent to an average throughput of all the MSs accessing the RS, namely the calculation can be simplified to the calculation of the average throughput of the MSs; the load condition of each RS is reported to the BS after the calculation.

Step 704, the BS allocates the random access frequency spectrum to the RS with a high load according to the load conditions of all the RSs.

Specifically, the BS sorts all the RSs according to the load conditions to determine a load factor $\alpha_{min}$ of the RS with the lightest load, calculates a relative load factor $\sigma_i = \alpha_{min}/\alpha_i$ ($0 \leq \sigma_i \leq 1$) of each RS in the cell in turn, calculates a probability $p_i = 1 - \sigma_i$ that the random access frequency spectrum is allocated to each RS according to the relative load factor $\sigma_i$; if the probability is high, it means the load of the RS is very high, namely the user fairness is poor, so it is necessary to allocate the random access frequency spectrum to the RS to ease the situation.

In the embodiment, the BS sorts the average throughput of the MSs of each RS in the cell, for example: a possible sorting result may be: $thr_{RS2} < thr_{RS1} < thr_{RS3}$, wherein RS2 has the heaviest load while RS3 has the lightest load. The relative load factors of RS1, RS2 and RS3 in the cell are $$\frac{thr_{RS2}}{thr_{RS3}}, \frac{thr_{RS1}}{thr_{RS3}}$$

and 1 respectively. The values $p_1$, $p_2$ and $p_3$ of the probabilities that extra access bandwidth is allocated to RS1, RS2 and RS3 are calculated to be $$1 - \frac{thr_{RS2}}{thrs_{RS1}}, 1 - \frac{thr_{RS1}}{thr_{RS2}}$$

and 0 respectively. Whether extra access bandwidth is allocated to each RS is determined according to the criterion $B^*_{RSi} = B_{RSi} \cup B_{RA}$, if $\delta < p_i$, where $\delta$ is a parameter, specifically, a uniformly distributed random number in the range of (0,1), and $B_{RSi}$ and $B^*_{RSi}$ are available frequency spectrums of the $i^{th}$ RS before and after refreshing.

Step 705, the MS is scheduled by means of a proportional fairness scheduling algorithm.

The specific implementation is the same as the conventional art, so no details will be given herein.

Figure 8:
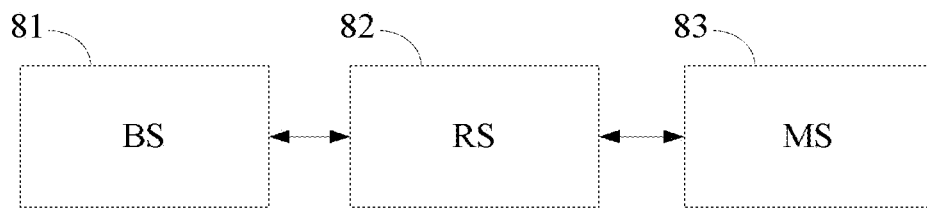
FIG. 8 is a schematic diagram of the structure of the system for frequency reuse in the wireless relay scenario according to an embodiment of the disclosure.

FIG. 8 is a schematic diagram of the structure of the system for frequency reuse in the wireless relay scenario according to an embodiment of the disclosure. As shown in FIG. 8, the system includes: a BS 81, one or more RSs 82 and one or more MSs 83.

The BS 81 is configured to pre-allocate a center frequency spectrum, an edge frequency spectrum and a random access frequency spectrum to a cell according to a scenario parameter in the cell, allocate the random access frequency spectrum to an RS 82 according to load conditions of all RSs 82 and schedule an MS 83.

Specifically, the scenario parameter in the cell includes: the number of RSs in the cell, the positions of the RSs in the cell, the frame type of the cell, statistic characteristics of users of the cell and other parameters. Specifically, the pre-allocated center frequency spectrum $B_{BS}$ is: the frequency spectrum that is used for data transmission of the direct link from the BS to the MS within the coverage of the cell (namely the link of BS→$MS_c$). Specifically, the edge frequency spectrum is: the frequency spectrum that is used for the data transmission of the reverse link from the BS to the RS (namely the link of BS→RS) and the access link from the RS to the MS at the cell edge (namely the link of RS→$MS_e$). The rest of the frequency spectrums are the random access frequency spectrum $B_{RA}$. Specifically, if a cell is divided into three sectors, $B_{BS}$ can be further divided into $B_{BS1}$, $B_{BS2}$ and $B_{BS3}$; if multiple RSs 83 are deployed in one cell, $B_{RS}$ can be further divided into $B_{RS1} \ldots B_{RSn}$.

The BS 81 allocating the random access frequency spectrum to the RS 82 according to the load conditions of all the RSs 82 includes: the BS 81 sorts all the RSs 82 according to the load conditions; calculates a relative load factor of each RS 82 according to a load factor of the RS 82 with the lightest load; calculates a probability that the random access frequency spectrum is allocated to each RS 82 and allocates the random access frequency spectrum to the RS 82 with the highest probability. Specifically, scheduling the MSs 83 is: the MSs 83 are scheduled by means of a proportional fairness scheduling algorithm.

The RS 82 is configured to calculate load conditions of all the MSs 83 covered by each RS 82 in the cell and report the load conditions to the BS 81.

Specifically, the above-mentioned all MSs 83 refer to all the MSs 83 in the edge area covered by each RS 82. Calculating the load conditions of the MSs 83 includes: the load condition of each RS 82 is calculated; if a full buffer service model is adopted, the load of each RS 82 can be equivalent to an average throughput of all the MSs 83 accessing the RS 82, namely the calculation can be simplified to the calculation of the average throughput of the MSs 83.

Preferably, the BS 81 is further configured to distinguish an MS 83 accessing through an RS 82 from all the MSs 83 in the cell.

Specifically, according to the positions of the MSs, the SINR and other information, all the MSs 83 are divided into an aggregate $M_{BS}$ accessed by the BS 81 or an aggregate $M_{RS}$ accessed by the RS 82. The aggregate $M_{RS}$ includes all MSs 83 accessed by the RS 82.

Preferably, the BS 81 is further configured to judge whether a preset time arrives, if so, calculate the load conditions of all the MSs 83 covered by each RS 82 in the cell, or distinguish an MS 83 accessing through an RS 82 from all the MSs 83 in the cell; otherwise, maintain wideband resources of the RSs 82.

The descriptions above are just preferred embodiments of the disclosure, and are not intended to limit the protection scope of the disclosure.

What is claimed is:

1. A method for frequency reuse in a wireless relay scenario, comprising:
    a base station, BS, pre-allocating a center frequency spectrum, an edge frequency spectrum and a random access frequency spectrum to a cell according to a scenario parameter in the cell;
    a relay station, RS, calculating load conditions of all mobile stations, MSs, covered by each RS in the cell and reporting the load conditions to the BS;
    the BS allocating the random access frequency spectrum to an RS according to load conditions of all RSs and scheduling an MS;
    wherein the pre-allocated center frequency spectrum is the frequency spectrum that is used for data transmission of a direct link from the BS to the MS within the coverage of the cell, the edge frequency spectrum is the frequency spectrum that is used for data transmission of a reverse link from the BS to the RS and a access link from the RS to the MS at the cell edge, the rest of the frequency spectrums are the random access frequency spectrum;
    wherein the scenario parameter in the cell comprises: the number of the RSs in the cell, positions of the RSs in the cell, a frame type of the cell, and statistic characteristics of users of the cell.

2. The method as claimed in claim 1, wherein before calculating the load conditions of all the MSs covered by each RS in the cell, the method further comprises: distinguishing an MS accessing through an RS from all MSs in the cell.

3. The method as claimed in claim 1, wherein after pre-allocating the center frequency spectrum, the edge frequency spectrum and the random access frequency spectrum, the method further comprises: judging whether a preset time arrives, if the preset time arrives, calculating the load conditions of all the MSs covered by each RS in the cell, or distinguishing an MS accessing through an RS from all MSs in the cell; otherwise, maintaining wideband resources of the RSs.

4. The method as claimed in claim 1, wherein the BS allocating the random access frequency spectrum to each RS according to the load conditions of all the RSs comprises:
    the BS sorting all the RSs according to the load conditions; calculating a relative load factor of each RS according to a load factor of an RS with a lightest load; according to the relative load factor; calculating a probability that the random access frequency spectrum is allocated to each RS, and allocating the random access frequency spectrum to an RS with a highest probability.

5. The method as claimed in claim 1, wherein scheduling the MS is embodied as: scheduling the MS by means of a proportional fairness scheduling algorithm.

6. A system for frequency reuse in a wireless relay scenario, comprising a base station , BS, and one or more relay station , RSs, wherein
    the BS is configured to pre-allocate a center frequency spectrum, an edge frequency spectrum and a random access frequency spectrum to a cell according to a scenario parameter in the cell, allocate the random access frequency spectrum to an RS according to load conditions of all RSs and schedule a mobile station , MS;
    the RS is configured to calculate load conditions of all MSs covered by each RS in the cell and report the load conditions to the BS;
    wherein the pre-allocated center frequency spectrum is the frequency spectrum that is used for data transmission of a direct link from the BS to the MS within the coverage of the cell, the edge frequency spectrum is the frequency spectrum that is used for data transmission of a reverse link from the BS to the RS and a access link from the RS to the MS at the cell edge, the rest of the frequency spectrums are the random access frequency spectrum;
    wherein the scenario parameter in the cell comprises: the number of the RSs in the cell, positions of the RSs in the cell, a frame type of the cell, and statistic characteristics of users of the cell.

7. The system as claimed in claim 6, wherein the BS is further configured to distinguish an MS accessing through an RS from all MSs in the cell.

8. The system as claimed in claim 6, wherein the BS is further configured to judge whether a preset time arrives, if the preset time arrives, calculate the load conditions of all the MSs covered by each RS in the cell, or distinguish an MS accessing through an RS from all MSs in the cell; otherwise, maintain wideband resources of the RSs.

9. The system as claimed in claim 6, wherein the BS allocating the random access frequency spectrum to each RS according to the load conditions of all the RSs comprises:
    the BS sorting all the RSs according to the load conditions; calculating a relative load factor of each RS according to a load factor of an RS with a lightest load; according to the relative load factor, calculating a probability that the random access frequency spectrum is allocated to each RS, and allocating the random access frequency spectrum to an RS with a highest probability.

10. The method as claimed in claim 2, wherein after pre-allocating the center frequency spectrum, the edge frequency spectrum and the random access frequency spectrum, the method further comprises: judging whether a preset time arrives, if the preset time arrives, calculating the load conditions of all the MSs covered by each RS in the cell, or distinguishing an MS accessing through an RS from all MSs in the cell; otherwise, maintaining wideband resources of the RSs.

11. The method as claimed in claim 2, wherein the BS allocating the random access frequency spectrum to each RS according to the load conditions of all the RSs comprises:
    the BS sorting all the RSs according to the load conditions; calculating a relative load factor of each RS according to a load factor of an RS with a lightest load; according to the relative load factor; calculating a probability that the random access frequency spectrum is allocated to each RS, and allocating the random access frequency spectrum to an RS with a highest probability.

12. The method as claimed in claim 2, wherein scheduling the MS is embodied as: scheduling the MS by means of a proportional fairness scheduling algorithm.

13. The system as claimed in claim 7, wherein the BS is further configured to judge whether a preset time arrives, if the preset time arrives, calculate the load conditions of all the MSs covered by each RS in the cell, or distinguish an MS accessing through an RS from all MSs in the cell; otherwise, maintain wideband resources of the RSs.

14. The system as claimed in claim 7, wherein the BS allocating the random access frequency spectrum to each RS according to the load conditions of all the RSs comprises:
 the BS sorting all the RSs according to the load conditions; calculating a relative load factor of each RS according to a load factor of an RS with a lightest load; according to the relative load factor, calculating a probability that the random access frequency spectrum is allocated to each RS, and allocating the random access frequency spectrum to an RS with a highest probability.

* * * * *